July 10, 1923.  1,461,466
G. W. STOUT
CABLE END AND HOUSING AND METHOD OF ASSEMBLING THE SAME
Filed Aug. 20, 1921
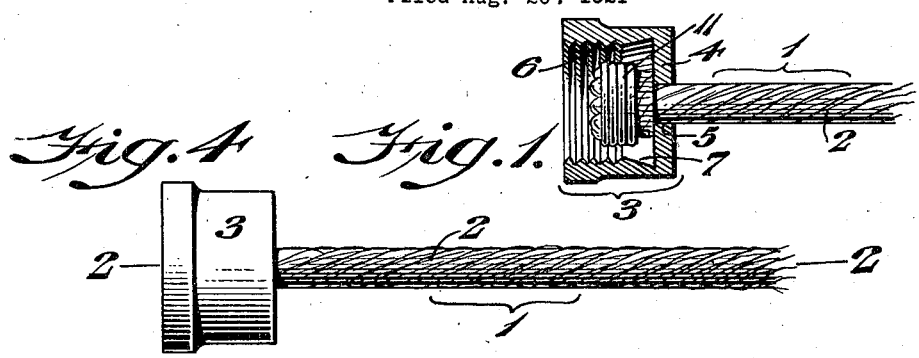
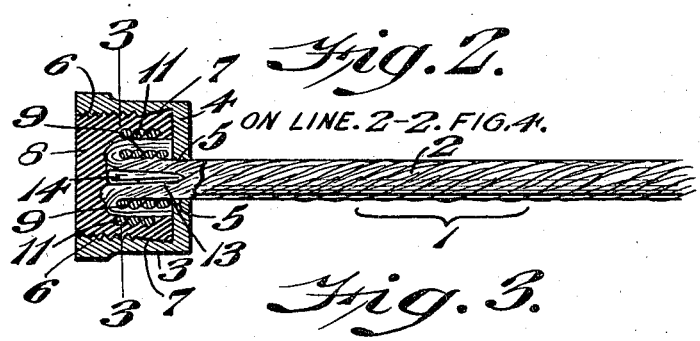
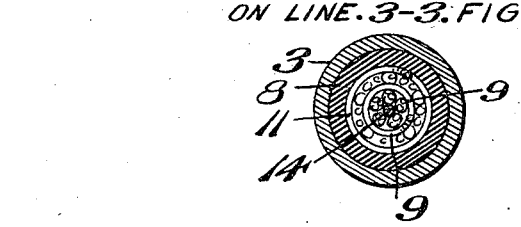
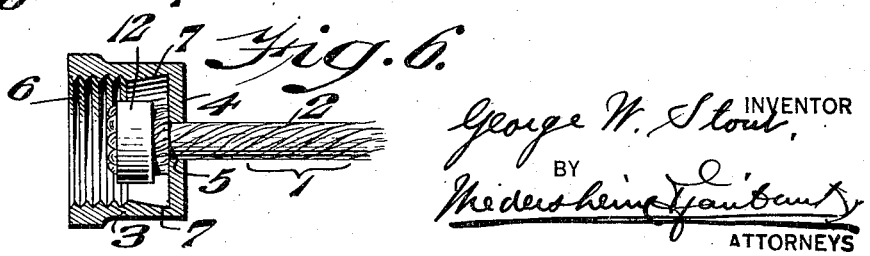
INVENTOR
George W. Stout,
BY
ATTORNEYS Patented July 10, 1923.

1,461,466

UNITED STATES PATENT OFFICE.

GEORGE W. STOUT, OF MERCHANTVILLE, NEW JERSEY.

CABLE END AND HOUSING AND METHOD OF ASSEMBLING THE SAME.

Application filed August 20, 1921. Serial No. 493,998.

*To all whom it may concern:*

Be it known that I, GEORGE W. STOUT, a citizen of the United States, residing at Merchantville, in the county of Camden, State of New Jersey, have invented a new and useful Cable End and Housing and Method of Assembling the Same, of which the following is a specification.

My invention relates to the general class of devices known as cable-ends and housings therefor, which are formed upon or applied to cables of various kinds for the purpose of making it possible through traction upon the cables to pull upon and draw in the direction of the traction an automobile or other object which it is desired to move.

The object of the invention is the construction of an efficient, inexpensive and effective cable-end and a method of forming it upon or attaching it to a cable, and then securing said end to its housing, which comprises certain features of construction and operation hereinafter described and particularly referred to in the claims.

To the above ends my invention consists of a novel cable end, and housing therefor and a novel manner of making and assembling the same.

In the drawings,

Figure 1 represents a central, longitudinal, sectional elevation of the housing of my cable before said housing is filled with the molten metal it is intended to contain, the cable and its bent and wrapped end being illustrated in side elevation.

Figure 2 represents a central, longitudinal, sectional elevation on the line 2—2 of Figure 4, of the cable-end and cable shown in Figure 1, illustrating, however, the end of the cable within the housing in section and the housing itself filled with sealing or retaining metal also illustrated.

Figure 3 represents a transverse section through the housing and inner end of the cable on the line 3—3 of Figure 2.

Figure 4 represents a side elevational view of the housing illustrated, as either in Figures 1 and 2 or in Figures 5 and 6, applied to the cable.

Figure 5 represents a view similar to Figure 2, illustrating flat metal bands applied to the separated and bent ends of the cable and subserving the same function as bands of wrapped wire illustrated in Figures 1, 2 and 3.

Figure 6 represents a view similar to Figure 1, the bands illustrated in section in Figure 5 being shown in side elevation.

Similar numerals of reference indicate corresponding parts.

In the drawings, 1 designates a cable of any preferred diameter and preferably formed of twisted strands 2 of cast steel or other wire. 3 designates a housing which it is desired to attach to an end of a cable in such manner that when attached it will form a permanently secured cable-end. This housing is hollow, preferably internally threaded, open at its outer end, and as to its inner end closed by a disc or end plate 4, centrally apertured as at 5 for the cable to pass through.

The threads or corrugations of the housing are designated 6 and preferably extend partway of the depth of the interior of the housing so that beyond them the housing may, if desired, be formed with a flare or mitre-dovetail 7.

The function of both the threads and the flare, when both are employed, is to assure the locking or securing within the interior of the housing of a mass of sealing or retaining metal 8, such, for instance, as melted lead, well tamped and pounded in so as to force out all of the air, and which binds the overturned or reversed and locked inner ends of the strands of the cable, which I will now describe.

Assume the cable in its normal condition to have been inserted through the aperture 5 in the base plate 4 of the housing to such an extent that its terminal is preferably slightly in excess of or beyond the depth of the housing:—

The end strands of the cable within the housing are then first separated, so as to lie almost in parallelism with each other, and then over the inner length of said separated ends is wrapped or mounted an inner band 9, which may, as illustrated in Figures 2 and 3, be formed of closely wrapped copper or other wire, or, as illustrated in Figures 5 and 6, be formed as a flat band 10 of copper or other metal.

After this inner band has been applied, the ends of the strands which extend outwardly beyond it are bent over reversely or backward toward the base plate of the housing, so as to encompass and lie upon the inner band, whether such band be formed of wrapped wire or of flat metal.

This backward bend of the strands having been completed, an outer band 11 of wire as shown in Figures 1, 2 and 3, or an outer band 12 of flat metal, as shown in Figures 5 and 6, is wrapped or driven over the overturned strand ends to retain them in place upon the inner band 10.

In the separating or unwrapping of the strands, I form or provide a hollow central seat 13 extending axially into the cable, into which I drive a preferably steel wedge 14, which expands the separated strands, as illustrated in Figures 2 and 5, so as to force them against the inner surfaces of both the inner and the outer bands and tightly retain the inturned ends of the strands in their position between the bands and preferably against the inner surface of the end plate of the housing.

After the driving in of the wedge, the banded inner end of the cable is preferably treated or coated with an acid solution of a strength so reduced as not to be injurious to highly tempered wire.

After this has been done and the banded end has been pulled into the position seen within the hollow interior of the housing, melted lead, or other sealing material, is poured within said housing and tamped and pounded to force out all of the air, thereby banding, welding and interlocking all of the elements into a solid mass which forms or constitutes an impervious integral head on the end of the cable, which cannot be pulled off under any conditions of use.

In the use of my device, I, of course, pass the cable through any preferred and usual form of apertured anchoring plate which it is unnecessary to illustrate, the diameter of the aperture of which corresponds with the diameter of the cable and also with that of the aperture in the end plate of the housing, through both which apertures the cable is passed.

In the practical operation, the end of the cable is of course first passed through the anchoring plate, and it should be also mentioned that for field or outdoor work, bands formed of copper wire are preferable to bands formed of plates of copper.

My invention is especially adapted for auto tow lines or for cables of a similar character adapted to heavy loads and wherein it is desired to attach the head or housing to the cable in such a manner that the parts will be interlocked or secured with such rigidity that they will have the appearance and function of being integral, the interlocking of the above described members being effected in such a way by my invention that their disconnection will not occur under ordinary conditions of use.

Having thus described my invention, what I claim as new and desire to secure by Letters Patent, is:—

1. A cable head, composed of a cable, a cup shaped housing having a bottom plate through which said cable passes, the outer end strands of said cable being reversely bent within said housing, inner annular retaining devices wound around the outer end of said cable and positioned between said outer end and the reversely bent strands, outer annular retaining devices wound around said reversely bent strands, a wedge driven into the outer end of said cable, and a sealing medium filling said housing and enclosing said wedge, and said reversely bent, banded cable ends.

2. A cable head, composed of a cable, a cup shaped housing having a bottom plate through which said cable passes, the outer end strands of said cable being untwisted and reversely bent within said housing, inner annular retaining devices wound around the outer end of said cable and positioned between said outer end and the reversely bent strands, outer annular retaining devices wound around said reversely bent strands, a wedge driven into the outer end of said cable, and a sealing medium filling said housing and enclosing said wedge and said reversely bent, banded cable ends.

3. A cable head which comprises a cable formed of twisted strands,—a hollow outwardly open-ended housing having an inner apertured end plate through which the end of the cable can be passed and said head having internal corrugations and a flare for retaining within it a sealing medium,—the strands of the cable being untwisted within the hollow interior of the housing and reversely bent,—retaining bands encompassing the untwisted but unreversed ends of the cable,—retaining bands encompassing the reversed ends of the cable,—and a sealing medium for sealing the ends of the cable, untwisted, reversed and banded as aforesaid, as introduced within the interior of the housing.

4. A cable head which comprises a cable formed of twisted strands,—a hollow outwardly open-ended housing having an inner apertured end plate through which the end of the cable can be passed and said head having internal corrugations and a flare for retaining within it a sealing medium,—the strands of the cable being untwisted within the hollow interior of the housing and reversely bent,—retaining bands encompassing the untwisted but unreversed ends of the cable,—retaining bands encompassing the reversed ends of the cable,—an acid application to the reversed and banded ends,—and a sealing medium for sealing the ends of the cable, untwisted, reversed and banded as aforesaid, as introduced within the interior of the housing.

5. As a new article of manufacture, the combination of a cable end and a hollow housing therefor, said end having its terminal strands untwisted and reversely bent, annular outer banding devices for securing such reversely bent strands upon said cable, a wedge inserted in the end of said cable and a body of sealing material tamped into said housing and interlocked therewith and enclosing said cable end and wedge.

6. As a new article of manufacture, a cable end, and a cup shaped housing therefor, said end having its terminal strands untwisted and reversely bent, within said said housing, annular inner and outer banding devices for the outer twisted and untwisted ends of said cable, and a body of sealing material contained within said housing and interlocked therewith, and enclosing said cable end.

GEORGE W. STOUT.

Witnesses:
ARTHUR E. CRAIG,
ELLA MCHUGH.